(12) United States Patent
Bunnell et al.

(10) Patent No.: US 8,407,700 B2
(45) Date of Patent: Mar. 26, 2013

(54) METHODS AND SYSTEMS FOR MERGING VIRTUALIZATION SUBLAYERS

(75) Inventors: Karl Bunnell, Highland, UT (US); Paul Mackay, Provo, UT (US); Jared Payne, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 1058 days.

(21) Appl. No.: 12/396,969

(22) Filed: Mar. 3, 2009

(65) Prior Publication Data
US 2010/0229169 A1    Sep. 9, 2010

(51) Int. Cl.
*G06F 9/455* (2006.01)

(52) U.S. Cl. .......................................................... 718/1

(58) Field of Classification Search ........................ None
See application file for complete search history.

(56) References Cited

U.S. PATENT DOCUMENTS

| | | | |
|---|---|---|---|
| 7,117,495 B2 | 10/2006 | Blaser et al. |
| 7,162,724 B2 | 1/2007 | Blaser et al. |
| 7,165,260 B2 | 1/2007 | Blaser et al. |
| 7,461,086 B1 | 12/2008 | Hurren et al. |
| 7,461,096 B1 | 12/2008 | Hurren et al. |
| 7,496,931 B2 | 2/2009 | Cook et al. |
| 7,512,977 B2 | 3/2009 | Cook et al. |
| 7,519,963 B1 | 4/2009 | Blaser et al. |
| 7,542,988 B1 | 6/2009 | Cook et al. |
| 7,549,164 B2 | 6/2009 | Cook et al. |
| 7,620,956 B2 | 11/2009 | Cook et al. |
| 7,877,413 B1 | 1/2011 | Cook et al. |
| 7,886,291 B1 | 2/2011 | Jones et al. |
| 7,945,897 B1 | 5/2011 | Cook |
| 7,970,789 B1 | 6/2011 | Blaser et al. |
| 8,010,961 B1 | 8/2011 | Cook et al. |
| 8,060,940 B2 | 11/2011 | McCorkendale et al. |
| 8,108,346 B1 | 1/2012 | Hurren et al. |
| 8,112,392 B1 | 2/2012 | Bunnell et al. |
| 8,112,767 B1 | 2/2012 | Cook |
| 2007/0180450 A1 | 8/2007 | Croft et al. |
| 2008/0189697 A1* | 8/2008 | Kachroo et al. ............. 717/171 |
| 2011/0061045 A1 | 3/2011 | Phillips |

FOREIGN PATENT DOCUMENTS

WO    2009132256    10/2009

OTHER PUBLICATIONS

Wolinsky et al., "On the Design of Virtual Machine Sandboxes for Distributed Computing in Wide-area Overlays of Virtual Workstations", 2006, Second International Workshop on Virtualization Technology in Distributed Computing (VTDC 2006).*
"Easy-to-Use, High Performance Application Virtualization"; (accessed May 15, 2009); http://www.xenocode.com/Products/Virtual-Application-Studio/Features.aspx.
"Welcome to the Thinstall Virtualization Suite 3.0"; (May 15, 2009); VMware https://thinstall.com/help/index.php?

(Continued)

*Primary Examiner* — Eddie P Chan
*Assistant Examiner* — John Lindlof
(74) *Attorney, Agent, or Firm* — ALG Intellectual Property, LLC

(57) ABSTRACT

A computer-implemented method may include identifying first and second sublayers of a virtualized application. The first and/or second virtualization sublayers may include a read-write sublayer, a read-only sublayer, a virtual-reset-point sublayer, and/or a patch sublayer. The computer-implemented method may also include merging an instance of the first virtualization sublayer with an instance of the second virtualization sublayer. Various other methods, systems, and computer-readable media are also disclosed.

20 Claims, 10 Drawing Sheets

OTHER PUBLICATIONS

Extended European Search Report Received in related International Application No. 10275023.9; Jul. 1, 2010.

Yu, Yang et al.; A Feather-weight Virtual Machine for Windows Applications; Stony Brook University; VEE'06; Jun. 14-16, 2006, Ottawa, Ontario, Canada.

Baratto, Ricardo A. et al; MobiDesk: Mobile Virtual Desktop Computing; Columbia University; MobiCom '04; Sep. 26-Oct. 1, 2004; Philadelphia PA.

Jared Blaser; Process Tracking Application Layered System; U.S. Appl. No. 11/324,571, filed Jan. 3, 2006.

Randall Cook; Dynamic Insertion and Removal of Virtual Software Sub-Layers; U.S. Appl. No. 12/058,782, filed Mar. 31, 2008.

Lance TeNgaio; Distributed Application Virtualization; U.S. Appl. No. 12/142,549, filed Jun. 19, 2008.

Jeremy Hurren; Feature Based Software Virtualization; U.S. Appl. No. 11/960,706, filed Dec. 20, 2007.

Karl Bunnell et al.; Methods and Systems for Creating and Applying Patches for Virtualized Applications; U.S. Appl. No. 12/369,512, filed Feb. 11, 2009.

Randall Cook; Automatic Virtualization Based on User-Defined Criteria; U.S. Appl. No. 12/024,079, filed Jan. 31, 2008.

* cited by examiner

METHODS AND SYSTEMS FOR MERGING VIRTUALIZATION SUBLAYERS

BACKGROUND

Information Technology (IT) administrators may spend a substantial amount of time managing software applications. Managing software applications may include resolving application conflicts, repairing damaged applications, migrating to new versions of applications, installing applications, and patching applications. These tasks may be frustrating and time-consuming.

Application virtualization technologies may simplify many IT administration tasks. For example, application virtualization may allow an administrator to turn on or off a user's access to applications and data, which may reduce the time it takes to provide users with the resources they need. Application virtualization may also allow an administrator to reset broken applications to a known-good state without fear of damaging other applications. Application virtualization may ensure that each virtualized application has its own copy of DLL files that it would normally share with other applications. This eliminates conflicts that occur when two or more applications may require different versions of the same DLL, thereby rescuing administrators from a condition commonly referred to as "DLL Hell."

Application virtualization may allow different versions of the same application to peacefully coexist. This means that an administrator may keep older versions intact and available while testing new versions. Even after migrating to a new version, an administrator may quickly rollback to the previous version at any time. Despite the numerous advantages of application virtualization, traditional virtualization technologies may not efficiently update and modify installed virtualized applications.

SUMMARY

The instant disclosure is directed to methods and systems for merging sublayers of a virtualized application. Embodiments of the instant disclosure may merge any virtualization sublayer with any other virtualization sublayer of a virtualized application. For example, a read-write sublayer may be merged with a read-only sublayer. By merging a read-write sublayer with a read-only sublayer of a virtualized application, embodiments of the present disclosure may establish a new reset point for the virtualized application. In some embodiments, a new reset point for a virtualized application may be established to update a virtualized application. In other embodiments, a new reset point for a virtualized application may be established to wrap plug-ins, user-specific settings, and/or other changes to a virtualized application into a read-only sublayer of the virtualized application.

In some embodiments, a layer-merging module may identify a virtualized application with a read-only virtualization sublayer and a read-write virtualization sublayer. The read-only virtualization sublayer may represent a first base state of the virtualized application and the read-write virtualization sublayer may store changes to the first base state of the virtualized application. The layer-merging module may merge an instance of the read-only virtualization sublayer and an instance of the read-write virtualization sublayer to create a modified read-only virtualization sublayer that comprises a second base state of the virtualized application. The second base state of the virtualized application may be a new reset point for the virtualized application.

Embodiments of the instant disclosure may also merge various other types of virtualization sublayers. For example, a first virtual-reset-point sublayer may be merged with a second virtual-reset-point sublayer. In some embodiments, a patch sublayer, a virtual-reset-point sublayer, a read-only sublayer, and/or a read-write sublayer may be merged with any other patch sublayer, virtual-reset-point sublayer, read-only sublayer, and/or read-write sublayer. The instant disclosure also includes various other embodiments, alternatives, and examples for merging virtualization sublayers.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
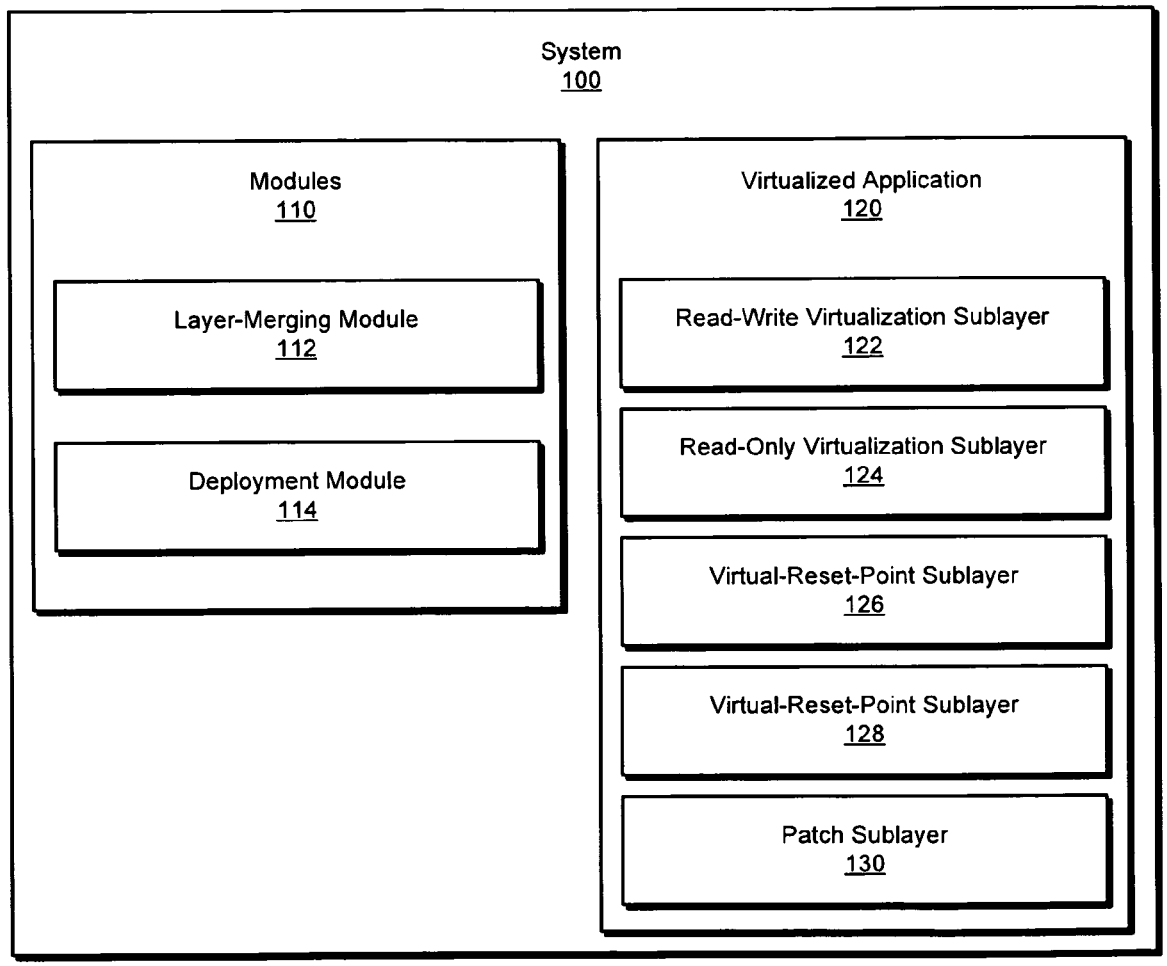
FIG. 1 is a block diagram of an exemplary system for merging virtualization sublayers according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for merging virtualization sublayers. Various embodiments may leverage the characteristics of virtualization technologies that provide read-only sublayers, read-write sublayers, and other virtualization sublayers (i.e., sublayers of a virtualization layer) for virtualized applications. In such technologies, a read-only sublayer may provide a base state for a virtualized application and a read-write sublayer may capture changes to the base state. In some embodiments, data from a read-write sublayer of a virtualized application may be moved a read-only sublayer of a virtualized application, thereby creating a new reset point for the virtualized application. In other embodiments, data from a first virtual-reset-point sublayer may be moved to a second virtual-reset-point sublayer. In certain embodiments, data from a patch sublayer may be merged with a read-only sublayer and/or a read-write sublayer.

Figure 2:
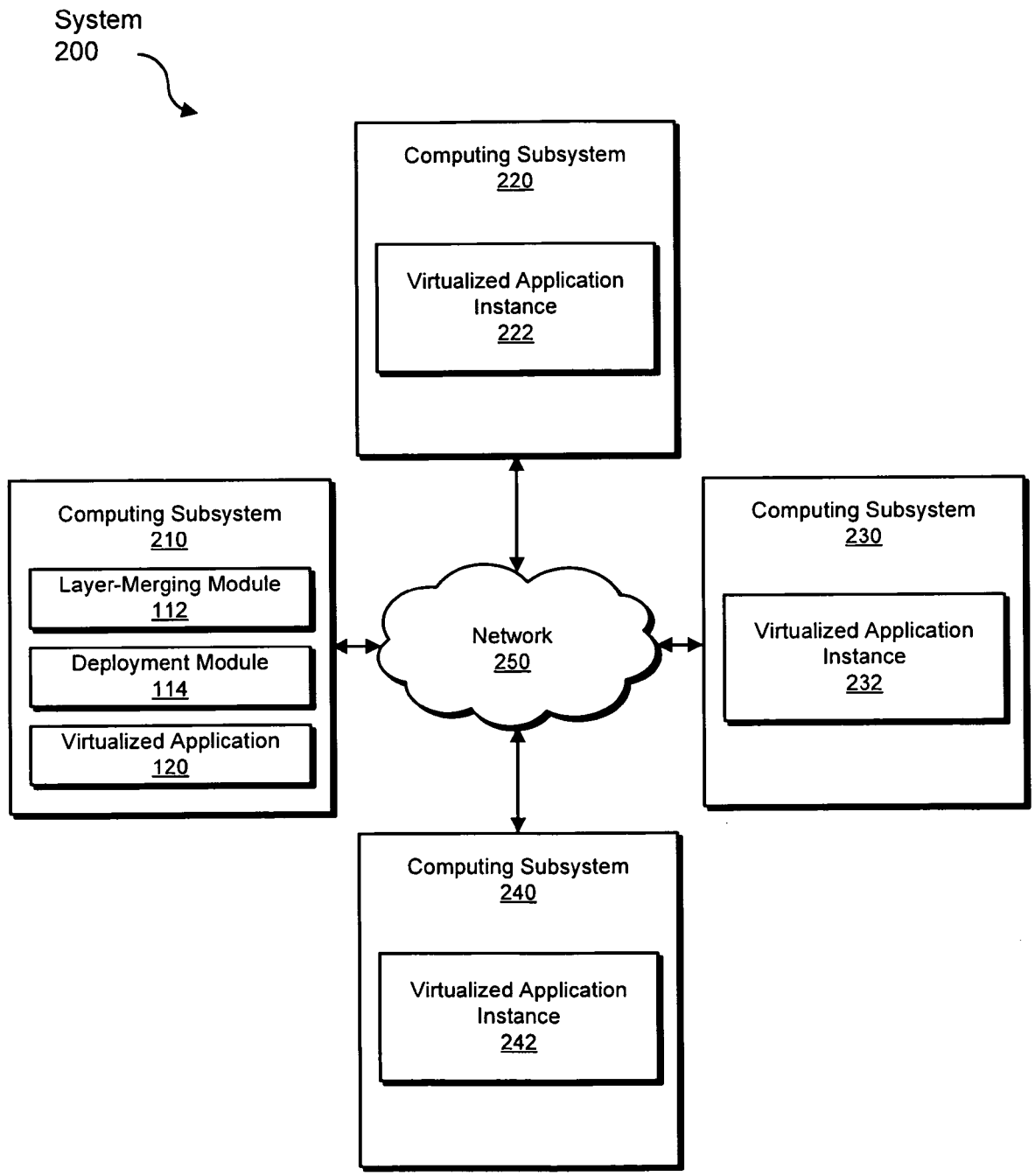
FIG. 2 is a block diagram of another exemplary system for merging virtualization sublayers according to certain embodiments.
Figure 3:
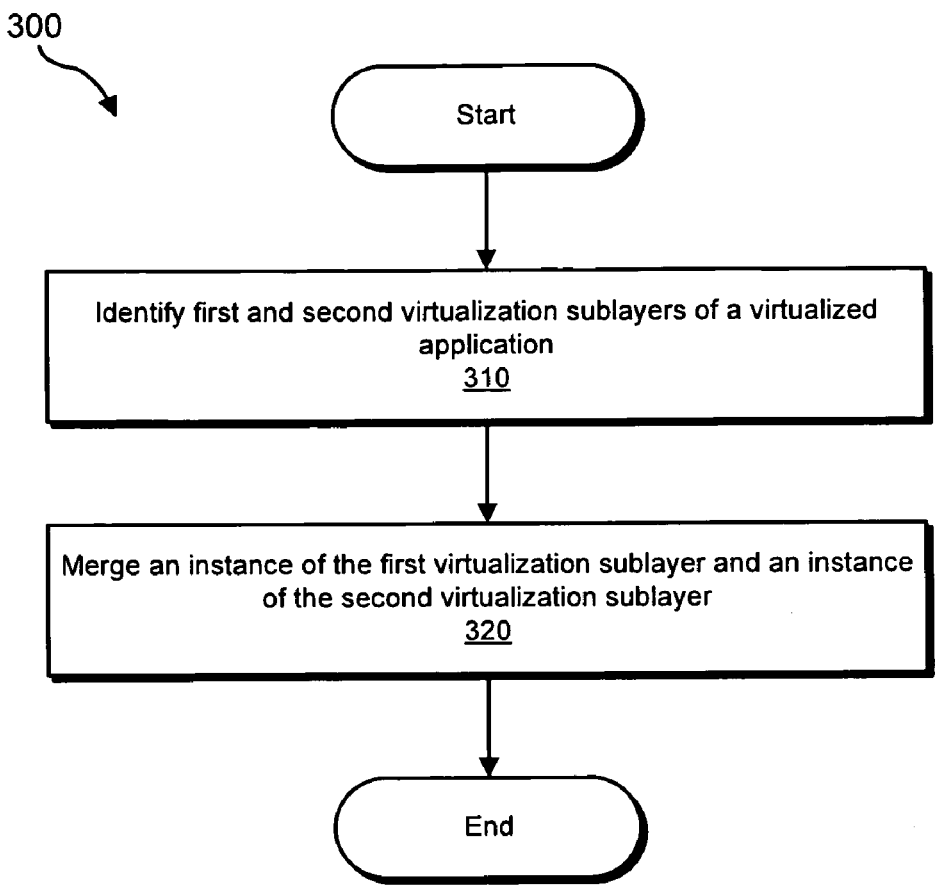
FIG. 3 is a flow diagram of an exemplary method for merging virtualization sublayers according to certain embodiments.
Figure 4:
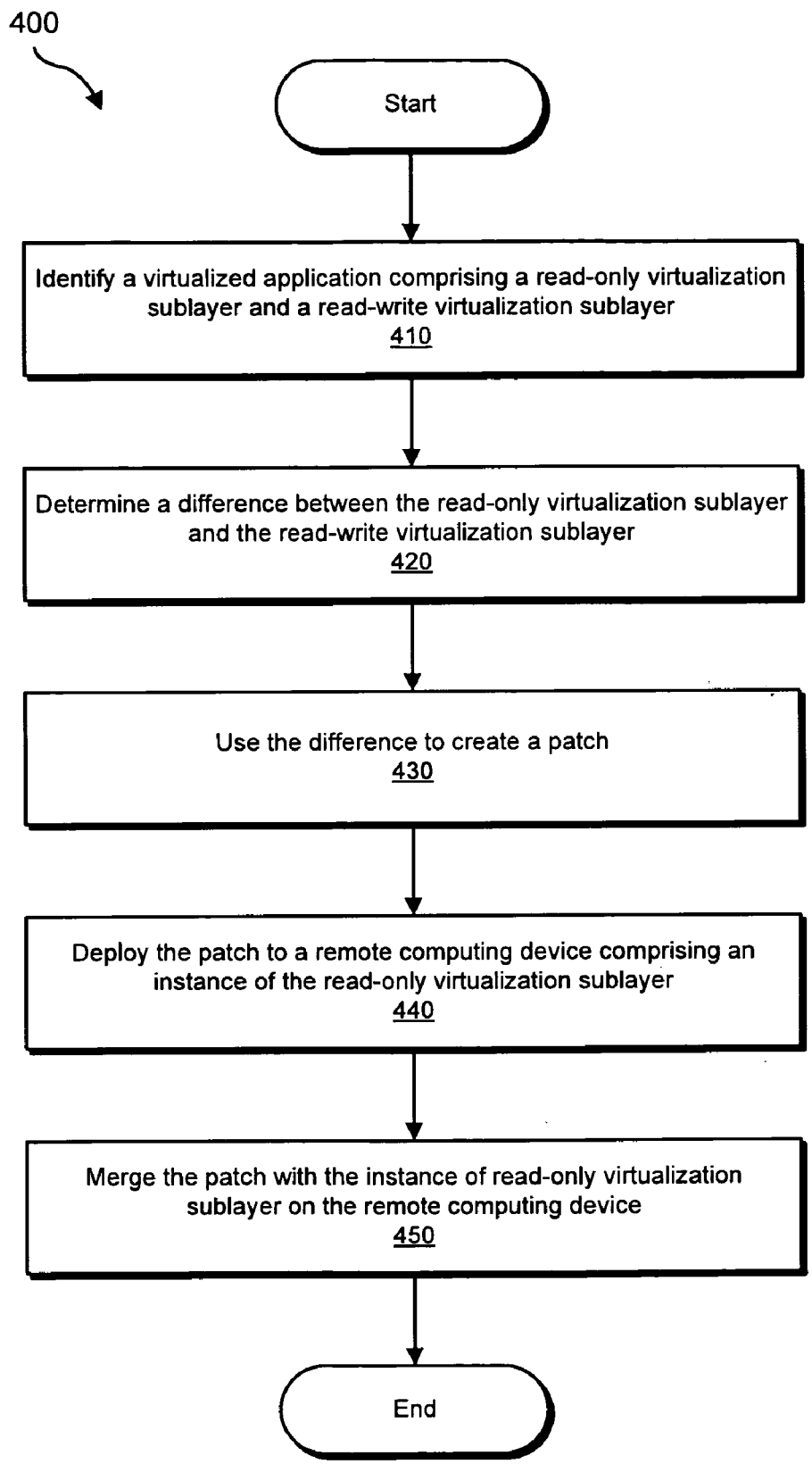
FIG. 4 is a flow diagram of another exemplary method for merging virtualization sublayers according to certain embodiments.
Figure 9:
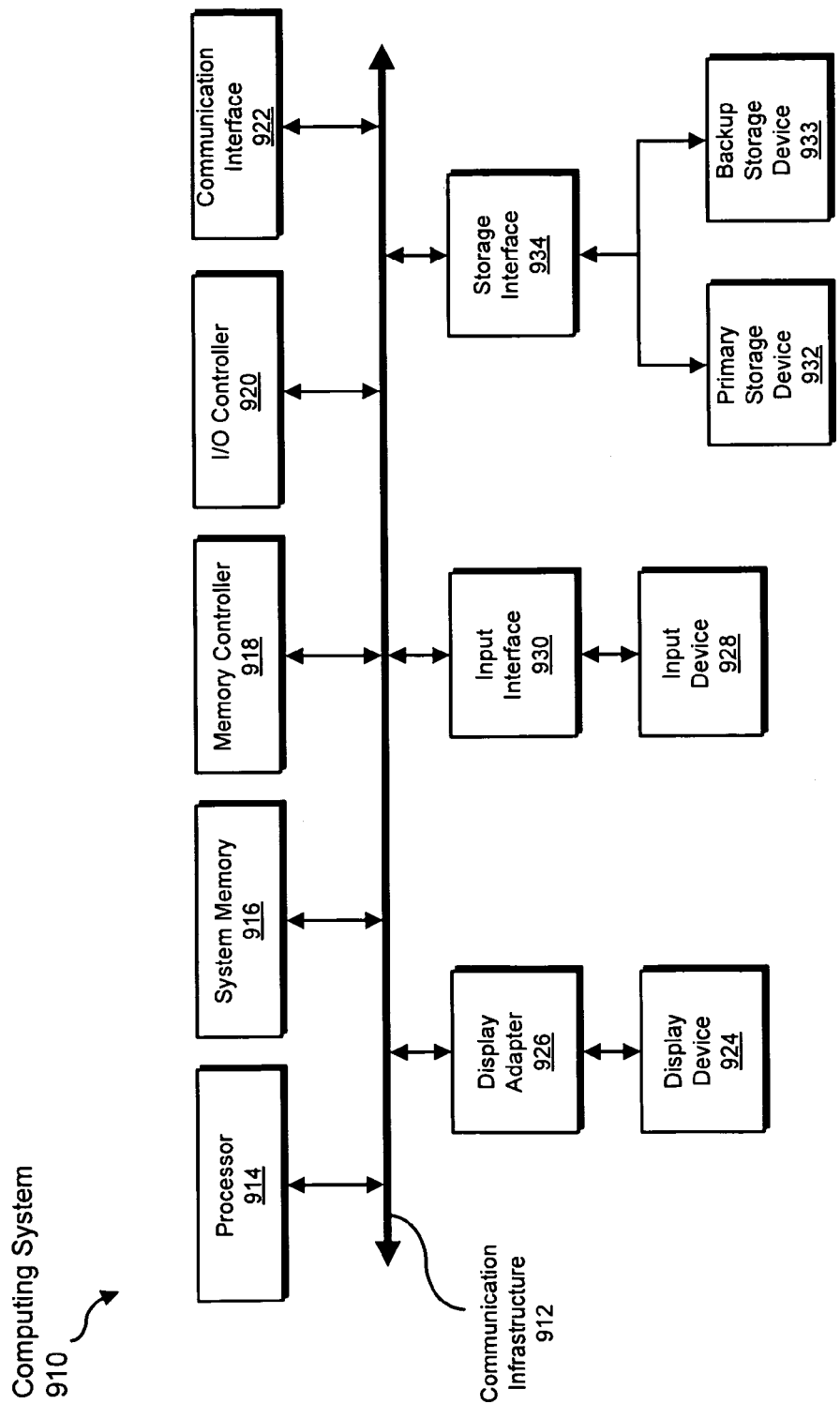
FIG. 9 is a block diagram of an exemplary computing system capable of implementing one or more of the embodiments described and/or illustrated herein.
Figure 10:
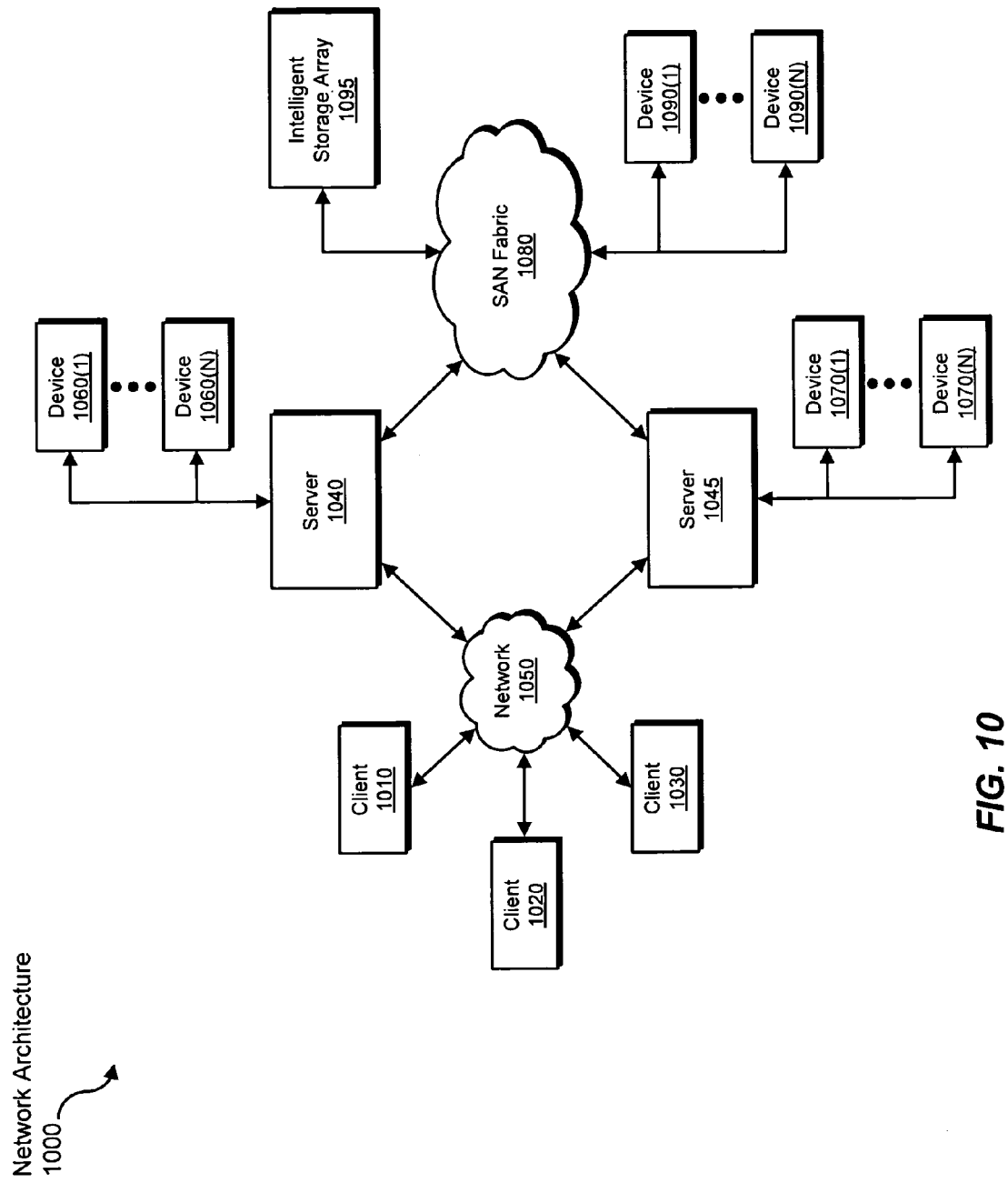
FIG. 10 is a block diagram of an exemplary computing network capable of implementing one or more of the embodiments described and/or illustrated herein.

FIGS. 1 and 2 show exemplary systems for merging virtualization sublayers, and FIGS. 3 and 4 show methods for accomplishing the same. FIGS. 5-8 show various application layering technologies, and FIGS. 9 and 10 illustrate an exemplary computing system and network architecture for implementing embodiments of the instant disclosure. As used here, the terms "sublayer" and "virtualization sublayer" refer to a sub-entity of a virtualization layer. A virtualization sublayer may include a read-write sublayer, a read-only sublayer, a patch sublayer, a virtual-reset-point sublayer, and/or any other sublayer of a virtualization layer.

FIG. 1 illustrates an exemplary system 100 for merging virtualization sublayers. System 100 may include modules 110 and a virtualized application 120. Modules 110 may include a layer-merging module 112 and a deployment module 114. Layer-merging module 112 may be programmed to identify a virtualized application with first and second sublayers. Layer-merging module 112 may also be programmed to merge an instance of the second sublayer with an instance of the first sublayer. Deployment module 114 may be programmed to determine a difference between the first sublayer and the second sublayer. Deployment module 114 may also be programmed to use the difference to create a patch and to deploy the patch to a remote computing device.

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 910 in FIG. 9 and/or portions of exemplary network architecture 1000 in FIG. 10. One or more of modules 110 in FIG. 1 may also represent all or portions of one or more special-purpose computers configured to perform one or more tasks associated with steps disclosed herein.

As previously mentioned, system 100 may include a virtualized application 120, which may include a read-write virtualization sublayer 122, a read-only virtualization sublayer 124, a virtual-reset-point sublayer 126, a virtual-reset-point sublayer 128, and a patch sublayer 130. A read-only sublayer, which is also referred to herein as a read-only virtualization sublayer, may include any sublayer that one or more users is prohibited from modifying. For example, a read-only sublayer may include a sublayer that may only be modified by an administrator. A read-only sublayer may provide a base state for an application installation. In contrast, a read-write sublayer may be configured to capture application changes made by users who are prohibited from modifying the read-only sublayer.

A virtual-reset-point sublayer may include a point-in-time representation of data associated with one or more users. For example, virtual-reset-point-sublayer 126 may include various users' data (e.g., files, directories, registry keys, registry entries, delete entries) at a first point in time, and virtual-reset-point-sublayer 128 may include the users' data at a second point in time. A patch layer may include data for an update of a virtualized application. Various examples of virtualization layers and virtualized applications are provided in the discussion corresponding to FIGS. 5-8.

FIG. 2 is a block diagram of an exemplary system 200 for merging virtualization sublayers. System 200 may include a computing subsystem 210, a computing subsystem 220, a computing subsystem 230, a computing subsystem 240, and a network 250. Computing subsystems 210, 220, 230, and 240 may include or be implemented as hardware, computing instructions (e.g., software), or a combination thereof. For example, computing subsystem 210 may include an administrator's computer, and computing subsystems 220, 230, and 240 may include end-user computing devices in an enterprise environment. In some embodiments, one or more of computing subsystems 210, 220, 230, 240 may include a desktop computer, a laptop computer, a portable-computing device, a workstation, a server, and/or any other suitable computing device.

As shown in FIG. 2, computing system 210 may include layer-merging module 112, deployment module 114, and virtualized application 120. Computing subsystems 220, 230, and 240 may each include an instance of virtualized application 120. For example, computing subsystem 220 may include a virtualized application instance 222, computing subsystem 230 may include a virtualized application instance 232, and computing subsystem 240 may include a virtualized application instance 242. In some embodiments, computing subsystems 220, 230, and 240 may also include layer-merging module 112.

Computing subsystems 210, 220, 230, and 240 may communicate over a network 250. Network 250 generally represents any medium or architecture capable of facilitating communications or data transfer. Network 250 may include, without limitation, the Internet, a Wide Area Network (WAN), a Local Area Network (LAN), a Personal Area Network (PAN), Power Line Communications (PLC), a cellular network (e.g., a GSM network), or the like. Network 250 may facilitate communication or data transfer using wireless and/or wired communications.

FIG. 3 illustrates an exemplary method 300 for merging virtualization sublayers. The steps in FIG. 3 may be performed by one or more components of system 100 and/or system 200. For example, at step 310 layer-merging module 112 may identify first and second sublayers of virtualized application 120.

Layer-merging module 112 may identify sub-layers of virtualized application 120 in a variety of scenarios and/or using a variety of different processes. For example, an IT administrator may use layer-merging module 112 to create a patch based on virtualized application 120. In such embodiments, the IT administrator may cause layer-merging module 112 to access virtualized application 120 for processing. In other embodiments, virtualized application 120 may be installed on a user's machine, and the user may want to incorporate changes in read-write virtualization sublayer 122 into read-only virtualization sublayer 124. In such embodiments, the user may cause layer-merging module 112 to access virtualized application 120 for processing.

In some embodiments, layer-merging module 112 may access virtualized application 120 in a local storage device. In other embodiments, layer-merging module 112 may access virtualized application 120 in a remote storage device. Layer-merging module 112 may access virtualized application 120 by reading data from read-write virtualization sublayer 122 and/or read-only virtualization sublayer 124 to prepare to merge read-write virtualization sublayer 122 and read-only virtualization sublayer 124. In other embodiments, layer-merging module 112 may read data from any other virtualization sublayers of virtualized application 120 to prepare the sublayers for merging.

At step 320, layer-merging module 112 may merge an instance of a first sublayer with and instance of the second sublayer. An instance of a virtualization sublayer may include any installation or copy of the virtualization sublayer. In some embodiments, an instance of a virtualization sublayer may be the virtualization sublayer. For example, read-write virtualization sublayer 122 may be the instance of the first sublayer referred to in step 320. Similarly, read-only virtualization sublayer 124 may be the instance of the second virtualization sublayer referred to in step 320. In such embodiments, layer-merging module 112 may merge an instance of the read-only virtualization sublayer and an instance of the read-write virtualization sublayer by merging read-only virtualization sublayer 124 and read-write virtualization sublayer 122.

In other embodiments, the instance of the read-only virtualization sublayer referred to in step 320 may be in a copy or other installation of virtualized application 120. For example, the second virtualization sublayer referred to in step 320 may be a read-only virtualization sublayer of virtualized application instance 222, virtualized application instance 232, and/or virtualized application instance 242. In such embodiments, the instance of the first virtualization sublayer referred to in step 320 may be a patch deployed by deployment module 114 to one or more of computing subsystems 220, 230, and/or 240. The patch may represent an instance of read-write virtualization sublayer 122 and may be merged with a read-only sublayer of virtualized application instance 222, 232, and/or 242.

In some embodiments, layer-merging module 112 may merge user-specific data from a first virtualization sublayer into a second virtualization sublayer. In some embodiments, merging user-specific data may be useful when a user wants to include user-specific settings and/or other changes made by the user, such as updates or plug-ins added to an application, into a read-only virtualization sublayer of the application. By merging user-specific data into a read-only virtualization sublayer, a user may provide a virtualized application base state (i.e., reset point) that includes the user's settings.

Layer-merging module 112 may merge user-specific data from an instance of a read-write virtualization sublayer (or any other virtualization sublayer) into an instance of a read-only virtualization sublayer by retrieving file-system data from the instance of the read-write virtualization sublayer and copying the file-system data to a user-template region of the instance of the read-only virtualization sublayer. File-system data may include any file, directory, or other data stored in a file structure of the read-write virtualization sublayer.

A user-template region of a read-only virtualization sublayer may include any region of the sublayer that stores user-specific data. For example, a user-template region of a read-only sublayer may include files, folders, and/or registry settings that are copied into a read-write sublayer when a virtualization layer is reset. In other words, when a virtualization layer is reset (i.e., when the read-write layer is emptied), data from the user-template region of the read-only sublayer may be copied to the read-write sublayer to establish a new baseline for the read-write sublayer after a reset.

In some embodiments, merging user-specific data from an instance of a read-write virtualization sublayer into an instance of a read-only virtualization sublayer may include retrieving registry data from the instance of the read-write virtualization sublayer and copying the registry data to a user-template region of the read-only virtualization sublayer. Registry data may include registry entries such as registry keys and/or registry values. In some embodiments, registry data may refer to data stored in a WINDOWS operating system registry.

Merging user-specific data from an instance of a read-write virtualization sublayer into an instance of a read-only virtualization sublayer may include merging user-specific data associated with two or more different users into the read-only virtualization sublayer. For example, user-specific data stored in two different user profiles may be merged into a single read-only virtualization sublayer. In such embodiments, conflicts between different user's settings may be resolved in any suitable manner. For example, a first user may have priority over a second user (priority may be based on user groups, user titles, etc.). If the first and second users have different values for the same setting, the first user's value may be used for the setting.

In addition to and/or instead of merging user-specific data, layer-merging module 112 may merge user-common data from the instance of the first virtualization sublayer into the instance of the second virtualization sublayer. User-common data may refer to data shared by multiple users and/or data that is not specific to a particular user. In other words, user-common data may include settings and files that are general to all users on a computer. For example, user-common registry data may include registry data stored in an HKEY_LOCAL_MACHINE WINDOWS registry hive. In contrast, user-specific registry data may be stored in an HKEY_CURRENT_USER registry hive. As another example, user-common data may include files that are accessible by multiple users on a computing device. In contrast, user-specific data may include files that are only accessible by and/or associated with a single user (e.g., associated with the user's account) of the computing device.

In some embodiments, layer-merging module 112 may determine a difference between the instance of the first virtualization sublayer and the instance of the second virtualization sublayer to determine which user-common file-system data to merge. For example, layer-merging module 112 may identify at least one file in an instance of a read-write virtualization sublayer that is not located in an instance of a read-only virtualization sublayer. Layer-merging module 112 may additionally or alternatively identify at least one file in the instance of the read-write virtualization sublayer that is a modified version of a corresponding file in the instance of the read-only virtualization sublayer and/or identify at least one directory the instance of the read-write virtualization sublayer that is not located in the instance of the read-only virtualization sublayer. Layer-merging module 112 may copy and/or move one or more of the files and/or directories from the instance of the read-write virtualization sublayer into the instance of the read-only virtualization sublayer.

When merging user-common registry data, layer-merging module 112 may copy one or more registry keys and/or values from a first virtualization layer registry area to a second virtualization layer registry area. For example, layer-merging module 112 may overwrite registry keys and/or values in the second virtualization sublayer with keys and values from the first virtualization layer. Layer-merging module 112 may additionally or alternatively add registry keys and/or values to the second virtualization sublayer.

For user-common and/or user-specific data, layer-merging module 112 may identify file-system data and/or registry data deleted from the first virtualization sublayer. In some embodiments, a virtualization system may track deleted files in one or more deleted-objects files. For example, a virtualization system may store entries for deleted files and/or directories in a deleted-file-system-data file, such as a DELLIST.TXT file. The virtualization system may store entries for deleted registry keys and/or values in a deleted-registry-data file, such as a DELREG.TXT file.

Layer-merging module 112 may parse one or more deleted-objects files and may search the second virtualization sublayer for any files, directories, registry keys, registry values, and/or other data identified in a deleted-objects file. Layer-merging module 112 may remove files, directories, registry keys, and/or registry values identified in a deleted-objects file from the second virtualization sublayer.

As previously mentioned, virtualization sublayers may be merged in a variety of contexts. In some embodiments, data from a first virtualization sublayer may be moved directly into a second virtualization sublayer. In other embodiments, a difference between first and second virtualization sublayers may be computed, and the difference may be used to merge the virtualization sublayers.

While the discussion corresponding to FIG. 3 focuses on examples of merging read-write sublayers with read-only sublayers, various other types of sublayers may also be merged following the processes described in the discussion of FIG. 3. For example, a first virtual-reset-point sublayer may be merged with a second virtual-reset-point sublayer. The first virtual-reset-point sublayer may be from a more recent point in time than the second virtual-reset-point sublayer, and merging the two sublayers may include copying data from the more recent sublayer (the first virtual-reset-point sublayer) to the older sublayer (second virtual-reset-point sublayer). In such embodiments, data for multiple users may be copied from the first virtual-reset-point sublayer to the second virtual-reset-point sublayer.

In other embodiments, a patch virtualization layer may be merged with a read-only virtualization layer. Copying the patch virtualization layer to the read-only virtualization sublayer may provide a reset point (i.e., the read-only virtualization sublayer) that includes the patch.

FIG. 4 shows an exemplary method 400 for using a difference to create a patch for merging read-write and read-only virtualization sublayers. The steps shown in FIG. 4 may be performed by any suitable computer-executable code and/or computing system. In some embodiments, the steps shown in FIG. 4 may be performed by one or more of layer-merging module 112 and deployment module 114. For example, at step 410 deployment module 114 may identify virtualized application 120.

At step 420, deployment module 114 may determine a difference between read-only virtualization sublayer 124 and read-write virtualization sublayer 122 of virtualized application 120. Deployment module 114 may determine the difference between read-only virtualization sublayer 124 and read-write virtualization sublayer 122 in any suitable manner. For example, deployment module 114 may determine the difference between read-only virtualization sublayer 124 and read-write virtualization sublayer 122 by scanning the sublayers to identify files in the sublayers. Deployment module 114 may then compare files in the read-only virtualization sublayer 124 with files in the read-write virtualization sublayer 122. In some embodiments, determining the difference between read-only virtualization sublayer 124 and read-write virtualization sublayer 122 may include comparing a registry area in read-only virtualization sublayer 124 to a registry area in read-write virtualization sublayer 122.

In some embodiments, deployment module 114 may determine the difference between first and second read-only virtualization sublayers by creating a binary differential (i.e., a binary delta) between the sublayers. A binary differential between the sublayers may be created by generating the difference between registry and/or file-system redirection areas of read-only virtualization sublayer 124 and read-write virtualization sublayer 122.

Deployment module 114 may use any of the processes described above to determine the difference between read-only virtualization sublayer 124 and read-write virtualization sublayer 122. The difference may identify file-system and/or registry data to be added to the read-only virtualization sublayer. The difference may also identify file-system and/or registry data to be deleted from the read-only virtualization sublayer.

At step 430, deployment module 114 may use the difference to create a patch configured to update an instance of the read-only virtualization sublayer with data from the read-write virtualization sublayer. The patch may represent and/or include any difference between read-only virtualization sublayer 124 and read-write virtualization sublayer 122. For example, the patch may include a binary differential between read-only virtualization sublayer 124 and read-write virtualization sublayer 122.

Deployment module 114 may create a patch in any suitable manner. In some embodiments, deployment module 114 may create the patch by compressing the difference between the sublayers into a Virtual Patch Archive (VPA). The patch may also be formatted and/or packaged using any other formatting and/or packaging technologies.

At step 440, deployment module 114 may deploy the patch to a remote computing device. The remote computing device may include an instance of the read-only virtualization sublayer. The patch may be deployed using any suitable deployment and/or transmission technologies. In some embodiments, instead of being deployed to a remote computing device, the patch may be merged with a local virtualized application.

At step 450, layer-merging module 112 may merge the patch with the instance of the read-only virtualization sublayer on the computing device. Because the patch may represent and/or include data from read-write virtualization sublayer 122, the patch may be referred to as an instance of the read-write virtualization sublayer. Thus, merging an instance of the read-only virtualization sublayer and an instance of the read-write virtualization sublayer may refer to merging a patch with the instance of the read-only virtualization sublayer. In other embodiments, merging an instance of the read-only virtualization sublayer with an instance of the read-write virtualization sublayer may refer to directly merging the read-only virtualization sublayer with the read-write virtualization sublayer.

Layer-merging module 112 may merge the patch with the instance of the read-only virtualization sublayer in any suitable manner. Layer-merging module 112 may use any process described in step 320 above, or any other suitable process, to merge the patch with the instance of the read-only virtualization sublayer. For example, layer-merging module 112 may use the patch to directly modify the instance of the read-only virtualization sublayer. Such embodiments may be referred to as "in-place" updates or modifications. In other embodiments, layer-merging module 112 may create a new virtualization layer and copy one or more files and/or settings from the read-only virtualization sublayer of the original virtualization layer to a read-only virtualization sublayer of the new virtualization layer. Layer-merging module 112 may merge the patch into the read-only virtualization sublayer in the new virtualization layer.

The following discussion provides an example of how the method shown in FIG. 4 may be implemented by components of systems 100 and 200. An administrator using computing subsystem 210 may want to apply an update (e.g., a security update from a vendor, a bug fix, new features, or any other modification for an application) to virtualized applications instances 222, 232, and 242. In some embodiments, the update may be a self-update (i.e., an update that is configured to automatically install to an application). The administrator may apply the update to read-write virtualization sublayer 122. In some embodiments, the administrator may perform error-checking tests and/or other verification tests on the virtualized application to determine whether the update to read-write virtualization sublayer 122 caused any issues in the virtualized application.

If the virtualized application passes the verification test, the administrator may use deployment module 114 to create a patch, which may represent the difference between read-write virtualization sublayer 122 and read-only virtualization sublayer 124. Deployment module 114 may create the patch using any process presented in the disclosure corresponding to FIG. 4. The administrator may then use deployment module 114 to deploy the patch to computing subsystems 220, 230, and 240.

The patch may be applied to virtualized application instances 222, 232, and 242 using any process described herein. In some embodiments, the patch may include code programmed to automatically merge the patch with virtualized application instances 222, 232, and 242. Additionally or alternatively, code external to the patch (e.g., layer-merging module 112, which may be installed on one or more of computing subsystems 220, 230, and 240) may merge the patch with instances of read-only virtualization sublayer 124.

As another example, a user may make numerous changes to a read-write virtualization sublayer of a virtualized application. The user may make one or more changes to user-specific and/or user-common data in the virtualized application. The user may change settings, preferences, add bookmarks, install updates, and/or install plugins in the virtualized application. To capture these changes as a reset point for the virtualized application, the user may merge the read-write virtualization sublayer of the virtualized application into the read-only virtualization sublayer of the virtualized application.

While the discussion corresponding to FIG. 4 focuses of examples of merging read-write sublayers with read-only sublayers, various other types of sublayers may also be merged following the processes described in the discussion of FIG. 4.

As previously noted, embodiments of the instant disclosure may provide new reset points for virtualized applications by merging sublayers of a virtualized application. As used herein, the phrase "reset point" may refer to a base state of an application. An administrator may reset a virtualized application to the reset point (i.e., base state) by deleting the existing read-only virtualization sublayer and replacing it with a new read-only virtualization sublayer.

Figure 5:
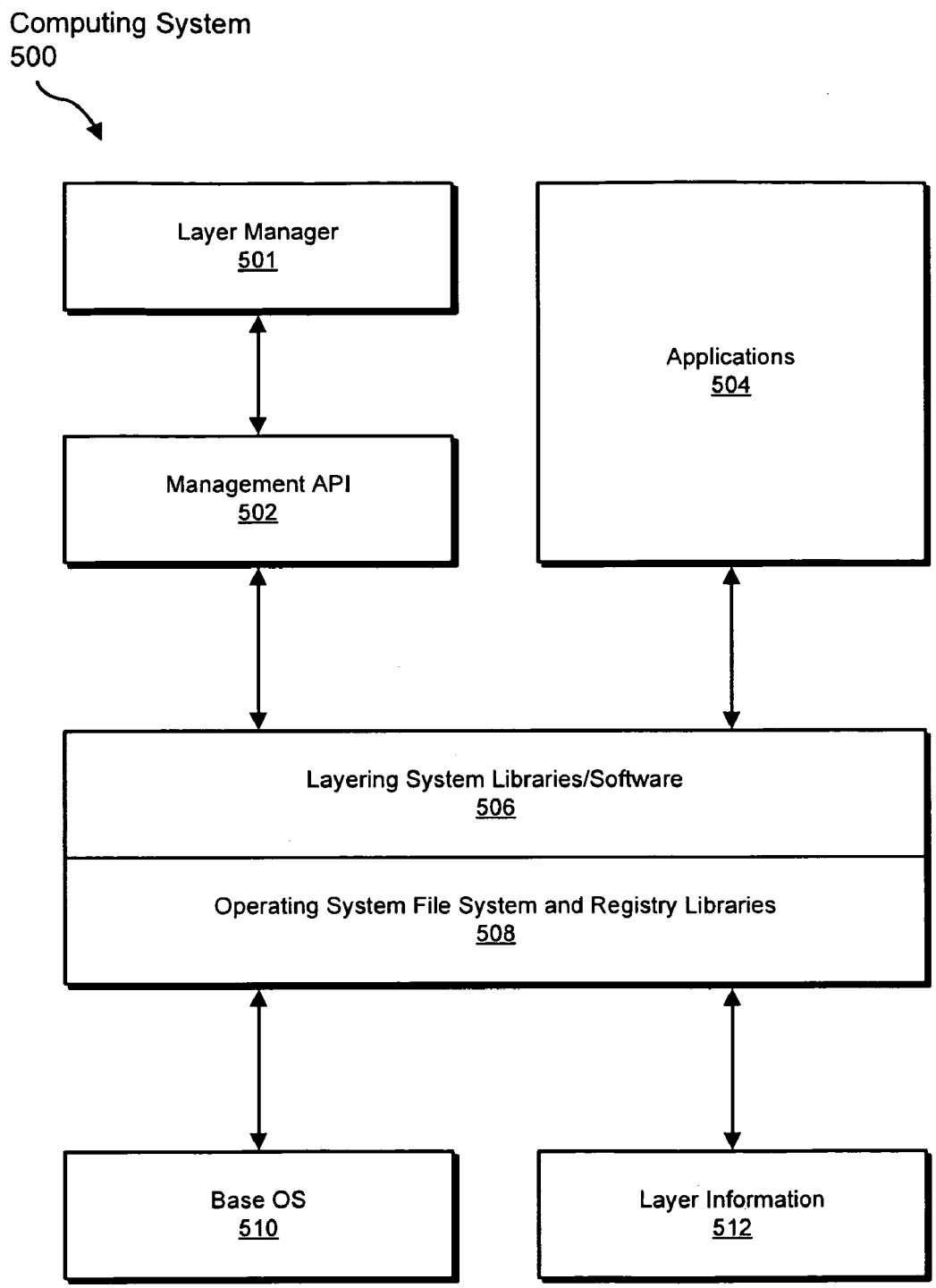
FIG. 5 is a block diagram of exemplary components of a conceptual level of a computing system configured to provide application virtualization according to certain embodiments.

FIGS. 5-8 provide examples of virtualization technologies and virtualized applications to which embodiments for merging read-only and read-write virtualization layers may be applied. FIG. 5 shows a conceptual organization of components of a computing system 500 with a virtualization layer. A base operating system 510 may form a platform with which applications may be executed and from which files may be accessed in file systems. Base operating system 510 may include registry settings, which may be globally available to applications for reading and writing. Computing system 500 may include libraries 508 for executing the functions of the operating system. Libraries 508 may include operating system files and registry entries. Layering system libraries and software 506 may be tied to libraries 508. Layering system libraries and software 506 may interpret file system and registry accesses from applications 504. The layering system software 506 may perform computations to determine whether the access should be permitted to continue to base operating system 510 or should be redirected to layer information 512. Layer information 512 may include information relating to the contents of files and registry settings. Layer manager 501 may control configuration of layering system software 506 through a management Application Programming Interface (API) 502.

As previously mentioned, in some application-virtualization technologies, each virtualization layer may include two sublayers: a read-only sublayer and a writable sublayer. An example of a virtualization technology that utilizes read-only and read-write sublayers is SYMANTEC WORKSPACE VIRTUALIZATION (SWV).

A read-only sublayer may include an immutable base state of an application. In some embodiments, users may not—even unintentionally—make changes to the read-only sublayer. For example, in SVS, only administrators may be able to edit, update, and/or delete the contents of read-only sublayers. An application may be reset by deleting the existing read-only sublayer and replacing it with a new read-only sublayer.

A read-write (i.e., writeable) sublayer may capture changes to a base state of an application. For example, when a user alters an application by changing default preferences, these changes may be written to the read-write sublayer.

Virtualized applications that include read-only sublayers and read-write sublayers may be created in any suitable manner. For example, SVS may allow a user to specify a setup program for an application the user wants to capture for purposes of virtualizing the application. SVS may launch the setup program and capture all of the applications, files, and processes, including child processes and process-induced changes, in a single Virtual Software Package (VSP). SVS may also capture MICROSOFT installer (MSI) and service control manager changes. When the setup process is complete, SVS may automatically stop the capture process. An administrator may then edit the VSP to include settings that the administrator wants to distribute to users.

Figure 6:
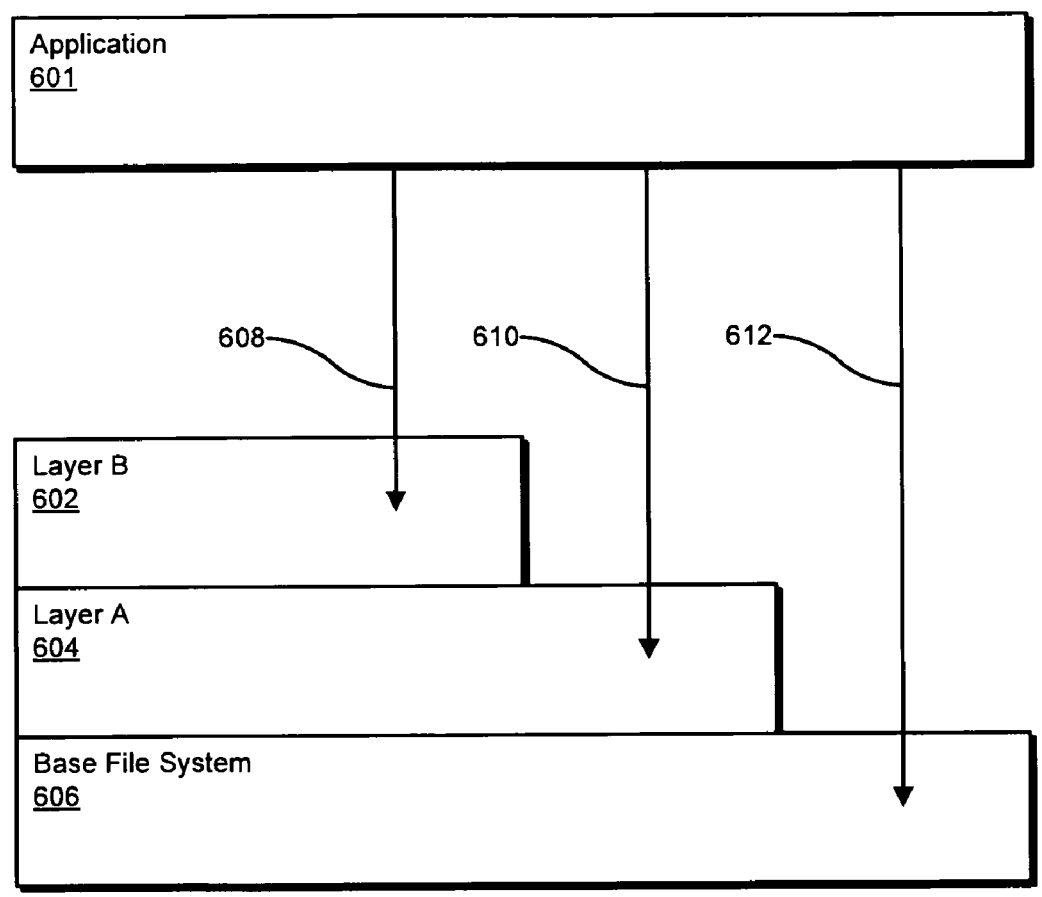
FIG. 6 is a block diagram showing virtualization layer prioritization according to certain embodiments.

FIG. 6 shows the operation of a computing system 600 with multiple virtualization layers. FIG. 6 illustrates an application 601, which may be a first and/or second version of an application. One or more files associated with application 601 may be located on virtualization layer B 602 and/or virtualization layer A 604. Virtualization layer B 602 may have priority over virtualization layer A 604, which in turn may have priority over a base file system 606. Application 601 may operate as follows. A first file access 608 may be made by application 601. A virtualization system may first search in layer B 602 for the requested file. Layer B 602 may include an entry for file access 608, and the corresponding file in layer B 602 may be returned to the application. Since layer B 602 has priority over layer A 604 and base file system 606, even if layer A 604 and base file system 606 have entries that correspond to file access 608, the virtualization system will return the entry from layer B 602.

Application 601 may make another file access 610. The virtualization system may not find a corresponding entry in layer B 602, but may find an entry in layer A 604. A third file access request 612 may not have a corresponding entry in layer B 602 or layer A 604, and the virtualization system may therefore return an entry from base file system 606.

Figure 7:
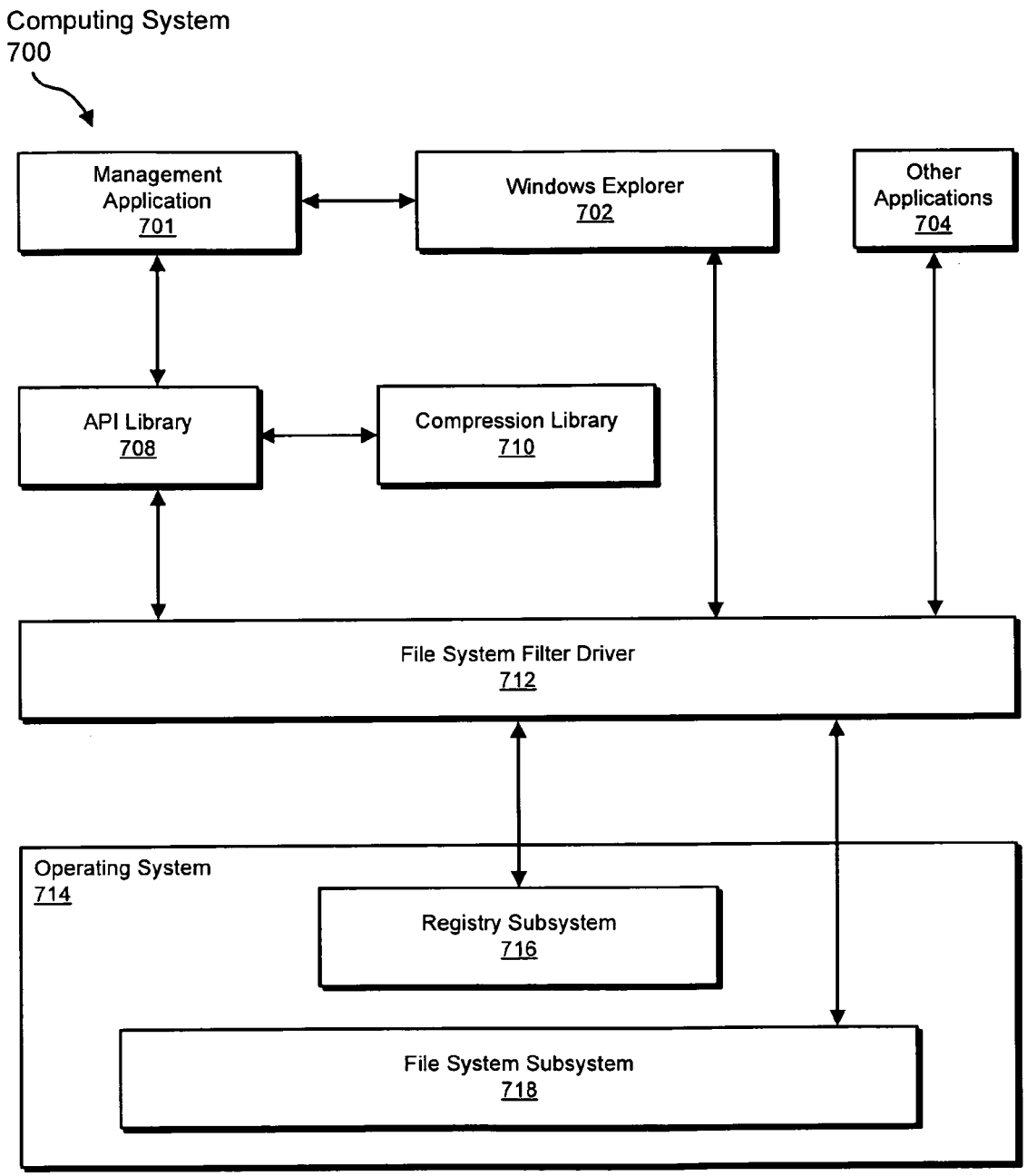
FIG. 7 is a block diagram of a component of a computing system that includes virtualization layers according to certain embodiments.

FIG. 7 shows an example of a computing system 700 with a virtualization layer installed. The computing system may include an operating system 714. Operating system 714 may include a registry subsystem 716 and a file system subsystem 718. A file system filter driver 712 may be installed on operating system 714 and may have first processing priority for registry and file system accesses. A management application 701 may provide an administrator with an interface to interact with file system filter driver 712 and make changes to layers. An API library 708 may provide a convenient interface for management application 701 to interface with file system file driver 712.

Management application 701 may provide notices to a WINDOWS EXPLORER 702 indicating that the contents of a mounted file system have been changed. Other applications 704 may interact with the system, performing read and write operations to the file system and registry through file system filter driver 712. A compression library 710 may be provided to compress layer information.

File system filter driver 712 may store components of each layer and sublayer in one of two redirect areas (i.e. areas to which it redirects system calls). For example, file system filer driver 712 may store registry settings and attributes in a registry subsystem 716 and may store files in a file system subsystem 718.

In each sublayer's registry redirection area, file system filter driver 712 may store information about the state of the layer to which the sublayer belongs. File system filter driver 712 may also store references to the sublayer's file redirection area, reference counts, and sub-keys that—through a service control manager—may enable it to handle duplicate services running in multiple layers. In addition, file system filter driver 712 may store references to registry keys that contain user identity information, data-layer specifications, a sub-key for information about exclude entries, and a list of variables that govern the location of layer-specific files. As the name suggests, exclude entries may define application files and processes that a user may want to exclude from layers.

In the root of the file redirection area, file system filter driver 712 may store variable entries that abstract operating system specific file locations to enable users to deploy Virtual Software Archives (VSAs) on computers running various types of operating systems. When file system filter driver 712 is loaded on a user's computer, file system filter driver 712 may determine values for user and system variables.

File system filter driver 712 may store files that comprise sublayers and numbered folders under a file-redirection-area directory. File system filter driver 712 may use registry and file redirection areas to present to an operating system—and by extension, applications and users—with an aggregate view of virtualized files and data.

For example, a user may launch WINDOWS EXPLORER to view the contents of a program file folder. The user's machine may be running a virtualized application, such as MOZILLA FIREFOX, and the FIREFOX layer may be active. File system filter driver 712 may intercept EXPLORER's calls to the file system. From the base, which may include all files, settings, and processes that do not reside in layers on the user's machine, file system filter driver 712 may gather a list of non-virtualized applications that reside in the program files folder. File system filter driver 712 may also redirect Explorer's calls to include FIREFOX, which would normally reside in the program files folder but which, in this case, resides in the file redirection area. File system filter driver 712 may then respond to EXPLORER's calls with a complete list of folders that the system expects to see in the program files directory, including FIREFOX. In this example, if the FIREFOX layer were deactivated, file system filter driver 712 would obscure its existence.

Figure 8:
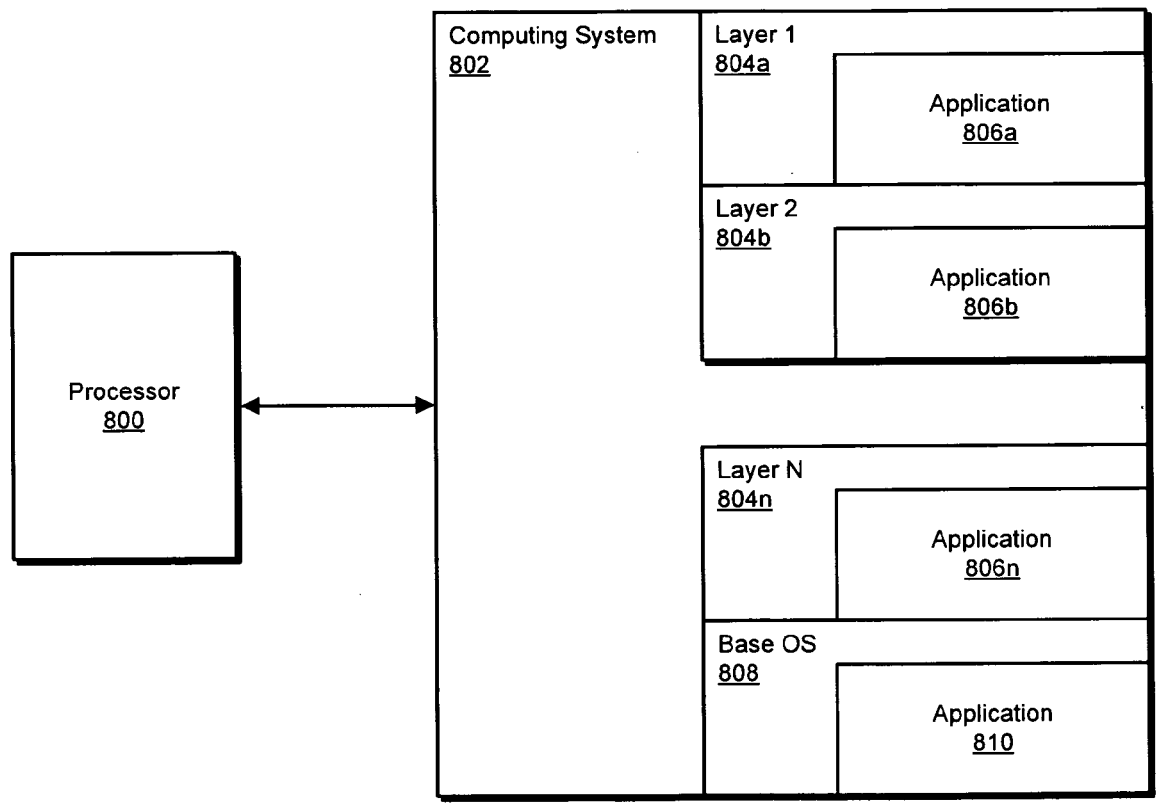
FIG. 8 is a block diagram showing organization of virtualization layers on a computing system according to certain embodiments.

FIG. 8 illustrates an example of a computing system 802 that includes virtualized applications 806*a-n*. Computing system 802 may contain a number of layers 804*a-n*. Applications 806*a-n* may be installed on layers 804*a-n*, respectively. As referred to herein, a layer (or virtualization layer) may refer to a set of file system and registry changes that may be managed by application virtualization software. In some embodiments, a layer may contain changes to one or more file systems but may not contain registry changes.

A layer may isolate an application from a base file system and may include files and a directory structure of the application's installation. The application files and directories may be shadowed or overlaid over the regular file system. Shared libraries (such as DLLs), system accessible configuration (such as registry entries), and version control may be managed by a layering subsystem.

Though each layer may be a separate and individual entity within a computing system, the application files, data, and system-accessible configuration may be presented as though they resided in their respective ordinary locations. Thus, an application stored in a layer may appear to the operating system of a computing system as if it had been installed using traditional installation techniques.

A software application installed in a virtualization layer may be an application in any commonly used meaning, including word processors, browsers, system tools, games, and the like, and the principles described herein may also extend to any other software installed on a computing system.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may comprise at least one processor 914 and system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, merging, determining, using, deploying, retrieving, copying, deleting, locating, applying, and testing steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may comprise both a volatile memory unit (such as, for example, system memory 916) and a non-volatile storage device (such as, for example, primary storage device 932, as described in detail below).

In certain embodiments, exemplary computing system 910 may also comprise one or more components or elements in addition to processor 914 and system memory 916. For example, as illustrated in FIG. 9, computing system 910 may comprise a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the steps or features described and/or illustrated herein, such as identifying, merging, determining, using, deploying, retrieving, copying, deleting, locating, applying, and testing.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for identifying, merging, determining, using, deploying, retrieving, copying, deleting, locating, applying, and testing steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network comprising additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, merging, determining, using, deploying, retrieving, copying, deleting, locating, applying, and testing steps disclosed herein. Communication interface 922 may also be used to perform and/or be a means for performing other steps and features set forth in the instant disclosure.

As illustrated in FIG. 9, computing system 910 may also comprise at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also comprise at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, merging, determining, using, deploying, retrieving, copying, deleting, locating, applying, and testing steps disclosed herein. Input device 928 may also be used to perform and/or be a means for performing other steps and features set forth in the instant disclosure.

As illustrated in FIG. 9, exemplary computing system 910 may also comprise a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also comprise other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Storage devices 932 and 933 may also be used, for example, to perform and/or be a means for performing, either alone or in combination with other elements, one or more of the identifying, identifying, merging, determining, using, deploying, retrieving, copying, deleting, locating, applying, and testing steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. Similarly, servers 1040 and 1045 generally represent computing devices or systems, such as application servers or database servers, configured to provide various database services and/or to run certain software applications. Network 1050 generally represents any telecommunication or computer network; including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, merging, determining, using, deploying, retrieving, copying, deleting, locating, applying, and testing steps disclosed herein. Network architecture 1000 may also be used to perform and/or be a means for performing other steps and features set forth in the instant disclosure.

As detailed above, computing system 910 and/or one or more of the components of network architecture 1000 may perform and/or be a means for performing, either alone or in combination with other elements, one or more steps of the exemplary methods described and/or illustrated herein. For example, a computing system (e.g., computing system 910 and/or one or more of the components of network architecture 1000) may perform a computer-implemented method for merging read-only and read-write virtualization sublayers. The computing system may identify a virtualized application comprising a read-only virtualization sublayer and a read-write virtualization sublayer. The read-only virtualization sublayer may comprise a first base state of the virtualized application. The read-write virtualization sublayer may be configured to store changes to the first base state of the virtualized application. The computing system may merge an instance of the read-only virtualization sublayer and an instance of the read-write virtualization sublayer to create a modified read-only virtualization sublayer that may comprise a second base state of the virtualized application.

In some embodiments, the computing system may determine a difference between the read-only virtualization sublayer and the read-write virtualization sublayer. The difference may represent the read-only virtualization sublayer. Furthermore, merging the instance of the read-only virtualization sublayer and the instance of the read-write virtualization sublayer may include merging the difference with the instance of the read-only virtualization sublayer.

In certain embodiments, the computing system may use the difference to create a patch configured to update the instance of the read-only virtualization sublayer with data from the instance of the read-write virtualization sublayer. The computing system may also deploy the patch to a remote computing device. The remote computing device may comprise the instance of the read-only virtualization sublayer. The patch may represent the read-write virtualization sublayer. Additionally, merging the instance of the read-only virtualization sublayer and the instance of the read-write virtualization sublayer may comprise merging the patch with the instance of the read-only virtualization sublayer.

In other embodiments, merging the instance of the read-only virtualization sublayer and the instance of the read-write virtualization sublayer may include merging user-specific data from the instance of the read-write virtualization sublayer into the instance of the read-only virtualization sublayer. In at least one embodiment, merging user-specific data from the instance of the read-write virtualization sublayer into the instance of the read-only virtualization sublayer may include retrieving file-system data from the instance of the read-write virtualization sublayer, and/or copying the file-system data to a user-template region of the instance of the read-only virtualization sublayer.

In some embodiments, merging user-specific data from the instance of the read-write virtualization sublayer into the instance of the read-only virtualization sublayer may include retrieving registry data from the instance of the read-write virtualization sublayer, and/or copying the registry data to a user-template region of the read-only virtualization sublayer. In other embodiments, merging user-specific data from the instance of the read-write virtualization sublayer into the instance of the read-only virtualization sublayer may include merging user-specific data associated with at least two different user profiles into the read-only virtualization sublayer. In certain embodiments, merging the instance of the read-only virtualization sublayer and the instance of the read-write virtualization sublayer may comprise merging user-common data from the instance of the read-write virtualization sublayer into the instance of the read-only virtualization sublayer.

In some embodiments, the computing system may determine a difference between the instance of the read-only virtualization sublayer and the instance of the read-write virtualization sublayer. The computing system may also copy data identified in the difference from the instance of the read-write virtualization sublayer to the instance of the read-only virtualization sublayer. In certain embodiments, determining the difference between the instance of the read-only virtualization sublayer and the instance of the read-write virtualization sublayer may include identifying at least one file in the instance of the read-write virtualization sublayer that is not located in the instance of the read-only virtualization sublayer, identifying at least one file in the instance of the read-write virtualization sublayer that is a modified version of a corresponding file in the instance of the read-only virtualization sublayer, and/or identifying at least one directory in the instance of the read-write virtualization sublayer that is not located in the instance of the read-only virtualization sublayer.

In some embodiments, the computing system may identify a file identified in a deleted-objects file that identifies objects deleted from the instance of the read-write virtualization sublayer. The computing system may identify a directory identified in the deleted-objects file. The computing system may also delete, from the instance of the read-only virtualization sublayer, the file identified in the deleted-objects file and/or the directory identified in the deleted-objects file.

In certain embodiments, the computing system may copy registry data from a registry in the instance of the read-write virtualization sublayer to a registry in the instance of the read-only virtualization sublayer. In other embodiments, the computing system may locate registry data identified in a deleted-objects file. The deleted-objects file may identify objects deleted from the instance of the read-write virtualization sublayer. The computing system may delete, from the instance of the read-only virtualization sublayer, the registry data identified in the deleted-objects file.

In some embodiments, the computing system may apply an update to the read-only virtualization sublayer before merging the instance of the read-only virtualization sublayer and the instance of the read-write virtualization sublayer. In other embodiments, the computing system may test the update after the update is applied and before merging to determine whether to merge the instance of the read-only virtualization sublayer and the instance of the read-write virtualization sublayer.

In at least one embodiment, the computing system may include a layer-merging module. The layer-merging module may identify a virtualized application comprising a read-only virtualization sublayer and a read-write virtualization sublayer. The read-only virtualization sublayer may comprise a first base state of the virtualized application. The read-write virtualization sublayer may be configured to store changes to the first base state of the virtualized application. The layer-merging module may merge an instance of the read-only virtualization sublayer and an instance of the read-write virtualization sublayer to create a modified read-only virtualization sublayer that may comprise a second base state of the virtualized application. The computing system may also include a processor configured to execute the layer-merging module.

In some embodiments, the computing system may include a deployment module. The deployment module may determine a difference between the read-only virtualization sublayer and the read-write virtualization sublayer. The deployment module may also use the difference to create a patch configured to update the instance of the read-only virtualization sublayer with data from the instance of the read-write virtualization sublayer. The deployment module may further deploy the patch to a remote computing device. The remote computing device may comprise the instance of the read-only virtualization sublayer and the layer-merging module.

In some embodiments, the layer-merging module may identify at least one file in the instance of the read-write virtualization sublayer that is not located in the instance of the read-only virtualization sublayer. The layer-merging module may identify at least one file in the instance of the read-write virtualization sublayer that is a modified version of a corresponding file in the instance of the read-only virtualization sublayer. The layer-merging module may also identify at least one file deleted from the instance of the read-write virtualization sublayer. The layer-merging module may further identify at least one registry entry deleted from the instance of the read-write virtualization sublayer.

The layer-merging module may copy at least one file from the instance of the read-write virtualization sublayer to the instance of the read-only virtualization sublayer. The layer-merging module may also copy at least one registry entry from the instance of the read-write virtualization sublayer to the instance of the read-only virtualization sublayer. The layer-merging module may delete at least one file from the instance of the read-only virtualization sublayer. The layer-merging module may also delete at least one registry entry from the instance of the read-only virtualization sublayer. In at least one embodiment, the layer-merging module may move data from the instance of the read-write virtualization sublayer to the instance of the read-only virtualization sublayer.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

We claim:

1. A computer-implemented method comprising:
    identifying a first virtualization sublayer of a virtualized application;
    identifying a second virtualization sublayer of the virtualized application;
    determining a difference between the first virtualization sublayer and the second virtualization sublayer, wherein the difference represents the first virtualization sublayer;
    using the difference to create a patch configured to update an instance of the second virtualization sublayer with data from an instance of the first virtualization sublayer;
    deploying the patch to a remote computing device, the remote computing device comprising the instance of the second virtualization sublayer, wherein the patch represents the first virtualization sublayer;
    merging the instance of the first virtualization sublayer with the instance of the second virtualization sublayer, wherein:
    the identifying the first virtualization sublayer, the identifying the second virtualization sublayer, and the merging are performed by a computing system comprising a storage device configured to store data in the first and second virtualization sublayers, and
    merging the instance of the second virtualization sublayer with the instance of the first virtualization sublayer comprises merging the patch with the instance of the second virtualization sublayer on the remote computing device.

2. The computer-implemented method of claim 1, wherein:
    the second virtualization sublayer comprises a read-only virtualization sublayer;
    the read-only virtualization sublayer comprises a first base state of the virtualized application;
    the first virtualization sublayer comprises a read-write virtualization sublayer;
    the read-write virtualization sublayer is configured to store changes to the first base state of the virtualized application;
    merging the instance of the first virtualization sublayer with the instance of the second virtualization sublayer comprises merging an instance of the read-write virtualization sublayer with an instance of the read-only virtualization sublayer to create a modified read-only virtualization sublayer that comprises a second base state of the virtualized application.

3. The computer-implemented method of claim 2, further comprising applying an update to the read-write virtualization sublayer before determining the difference and creating the patch.

4. The computer-implemented method of claim 3, further comprising testing the read-write virtualization sublayer after the update is applied and before determining the difference and creating the patch to determine whether the update causes any issues with the virtualized application.

5. The computer-implemented method of claim 4, further comprising determining that the update does not cause any issues with the virtualized application and, in response to determining that the update does not cause any issues with the virtualized application, performing the determining the difference, creating the patch, and deploying the patch.

6. The computer-implemented method of claim 1, wherein determining the difference between the first virtualization sublayer and the second virtualization sublayer comprises:
scanning the first and second virtualization sublayers to identify files in the first and second virtualization sublayers;
comparing the files identified in the first and second virtualization sublayers to determine the difference between the first virtualization sublayer and the second virtualization sublayer.

7. The computer-implemented method of claim 1, wherein determining the difference between the first virtualization sublayer and the second virtualization sublayer comprises creating a binary differential between the sublayers.

8. The computer-implemented method of claim 1, wherein determining the difference between the first virtualization sublayer and the second virtualization sublayer comprises comparing a registry area of the first virtualization sublayer with a registry area of the second virtualization sublayer.

9. The computer-implemented method of claim 1, wherein the difference identifies file-system and registry data that is to be added to and deleted from the instance of the first virtualization sublayer to merge the instance of the second virtualization sublayer with the instance of the first virtualization sublayer.

10. The computer-implemented method of claim 1, wherein using the difference to create the patch comprises compressing the difference into a virtual patch archive.

11. A system comprising:
a layer-merging module programmed to:
identify a virtualized application comprising a read-only virtualization sublayer and a read-write virtualization sublayer, the read-only virtualization sublayer comprising a first base state of the virtualized application and the read-write virtualization sublayer being configured to store changes to the first base state of the virtualized application;
merge an instance of the read-only virtualization sublayer and an instance of the read-write virtualization sublayer to create a modified read-only virtualization sublayer that comprises a second base state of the virtualized application, wherein merging the instances of the read-only virtualization sublayer and the read-write virtualization sublayer comprises merging user data from the read-write virtualization sublayer into the read-only virtualization sublayer, the user data comprising settings and/or preferences of one or more users;
a processor configured to execute the layer-merging module.

12. The system of claim 11, wherein:
the user data comprises user-specific data that is specific to a particular user and stored in an HKEY_CURRENT_USER registry hive.

13. The system of claim 11, wherein the layer-merging module is programmed to:
identify at least one file in the instance of the read-write virtualization sublayer that is not located in the instance of the read-only virtualization sublayer;
identify at least one file in the instance of the read-write virtualization sublayer that is a modified version of a corresponding file in the instance of the read-only virtualization sublayer;
identify at least one file deleted from the instance of the read-write virtualization sublayer;
identify at least one registry entry deleted from the instance of the read-write virtualization sublayer;
copy at least one file from the instance of the read-write virtualization sublayer to the instance of the read-only virtualization sublayer;
copy at least one registry entry from the instance of the read-write virtualization sublayer to the instance of the read-only virtualization sublayer;
delete at least one file from the instance of the read-only virtualization sublayer;
delete at least one registry entry from the instance of the read-only virtualization sublayer.

14. The system of claim 11, wherein the layer-merging module is programmed to move data from the instance of the read-write virtualization sublayer to the instance of the read-only virtualization sublayer.

15. A non-transitory computer-readable-storage medium comprising one or more computer-executable instructions that, when executed by a computing device, cause the computing device to:
identify a virtualized application comprising a first virtualization sublayer and a second virtualization sublayer;
determine a difference between the first virtualization sublayer and the second virtualization sublayer, wherein the difference represents the first virtualization sublayer;
use the difference to create a patch configured to update an instance of the second virtualization sublayer with data from an instance of the first virtualization sublayer;
deploy the patch to a remote computing device, the remote computing device comprising the instance of the second virtualization sublayer, wherein the patch represents the first virtualization sublayer;
merge the instance of the first virtualization sublayer with the instance of the second virtualization sublayer by merging the patch with the instance of the second virtualization sublayer on the remote computing device.

16. The system of claim 11, wherein:
a first virtualization sublayer comprises a first virtual-reset-point sublayer;
a second virtualization sublayer comprises a second virtual-reset-point sublayer;
the layer-merging module is programmed to merge an instance of the first virtualization sublayer with an instance of the second virtualization sublayer by copying user-specific data associated with at least two different users from the second virtual-reset-point sublayer into the first virtual-reset-point sublayer.

17. The system of claim 11, wherein:
the layer-merging module is programmed to merge an instance of a first virtualization sublayer with an instance of a second virtualization sublayer by merging user-common data from the instance of the first virtualization sublayer into the instance of the second virtualization sublayer;
the user-common data comprises settings that are shared by multiple users;
the user data comprises the user-common data.

18. The system of claim 17, wherein the layer-merging module is further programmed to:
determine a difference between the user-common data of the instance of the first virtualization sublayer and user-common data of the instance of the second virtualization sublayer;
copy user-common data identified in the difference from the instance of the first virtualization sublayer to the instance of the second virtualization sublayer, wherein the determining and the copying are performed by a computing system.

19. The system of claim 18, wherein:

the layer-merging module is programmed to determine the difference between the user-common data of the instance of the first virtualization sublayer and the user-common data of the instance of the second virtualization sublayer by performing at least one of:
- identifying at least one file in the instance of the first virtualization sublayer that is not located in the instance of the second virtualization sublayer;
- identifying at least one file in the instance of the first virtualization sublayer that is a modified version of a corresponding file in the instance of the second virtualization sublayer;
- identifying at least one directory in the instance of the first virtualization sublayer that is not located in the instance of the second virtualization sublayer;
- identifying at least one of:
  - a file identified in a deleted-objects file, the deleted-objects file identifying objects deleted from the instance of the first virtualization sublayer;
  - a directory identified in the deleted-objects file;

the layer-merging module is programmed to merge the instance of the first virtualization sublayer with the instance of the second virtualization sublayer by performing at least one of:
- copying the at least one file that is not located in the instance of the second virtualization sublayer to the instance of the second virtualization sublayer;
- copying the at least one file that is a modified version of a corresponding file in the instance of the second virtualization sublayer to the instance of the second virtualization sublayer;
- copying the at least one directory that is not located in the instance of the second virtualization sublayer to the instance of the second virtualization sublayer;
- deleting, from the instance of the second virtualization sublayer, the file identified in the deleted-objects file;
- deleting, from the instance of the second virtualization sublayer, the directory identified in the deleted-objects file.

20. The system of claim 17, wherein the layer-merging module is further programmed to perform at least one of:
- copying user-common registry data from a registry in the instance of the first virtualization sublayer to a registry in the instance of the second virtualization sublayer, wherein the copying is performed by a computing system;
- locating user-common registry data identified in a deleted-objects file, the deleted-objects file identifying objects deleted from the instance of the first virtualization sublayer, wherein the locating is performed by the computing system;
- deleting, from the instance of the second virtualization sublayer, the user-common registry data identified in the deleted-objects file, wherein the deleting is performed by the computing system.

* * * * *